United States Patent
Dixon et al.

(10) Patent No.: US 10,895,207 B2
(45) Date of Patent: Jan. 19, 2021

(54) METHOD OF OPERATING AN ENGINE ASSEMBLY

(71) Applicant: Ford Global Technologies, LLC, Dearborn, MI (US)

(72) Inventors: Jon Dixon, Maldon (GB); Nicholas Michael Parisi, Plymouth, MI (US); Jeffrey B. Schneyer, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 16/222,818

(22) Filed: Dec. 17, 2018

(65) Prior Publication Data

US 2019/0203652 A1 Jul. 4, 2019

(30) Foreign Application Priority Data

Jan. 4, 2018 (GB) .................................. 1800098.4

(51) Int. Cl.
*F02D 41/00* (2006.01)
*F02M 26/02* (2016.01)
(Continued)

(52) U.S. Cl.
CPC .......... *F02D 41/0007* (2013.01); *F02B 37/18* (2013.01); *F02B 37/24* (2013.01);
(Continued)

(58) Field of Classification Search
CPC .... F02B 2039/166; F02B 37/12; F02B 37/18; F02B 37/24; F02D 2250/34;
(Continued)

(56) References Cited

U.S. PATENT DOCUMENTS 6,067,800 A 5/2000 Kolmanovsky et al.
6,718,767 B1 4/2004 Caddy
(Continued)

FOREIGN PATENT DOCUMENTS

EP 1862654 A1 12/2007
EP 1865176 A1 12/2007
(Continued)

OTHER PUBLICATIONS

Great Britain Intellectual Property Office, Combined Search and Examination Report under Sections 17 and 18(3) Issued in Application No. GB1800098.4, dated Jul. 5, 2018, 5 pages.

*Primary Examiner* — Jesse S Bogue
(74) *Attorney, Agent, or Firm* — Geoffrey Brumbaugh; McCoy Russell LLP

(57) ABSTRACT

A method of operating an engine assembly is provided. The engine assembly comprises an engine and a turbocharger assembly, wherein a control parameter of the turbocharger assembly is controllable in order to control a level of boost provided by the turbocharger assembly. The method comprises determining a desirable pressure limit of exhaust gases upstream of a turbine of the turbocharger assembly, predicting a desirable limit value of the control parameter to be applied to the turbocharger assembly in order to achieve the desirable pressure limit, determining an error in the desirable limit value of the control parameter, adjusting the desirable limit value of the control parameter based on the error, and controlling the operation of the turbocharger assembly such that the adjusted limit value is not exceeded.

18 Claims, 4 Drawing Sheets

(51) Int. Cl.
  *F02B 37/24* (2006.01)
  *F02B 37/18* (2006.01)
  *F02D 41/14* (2006.01)

(52) U.S. Cl.
  CPC ..... *F02D 41/0077* (2013.01); *F02D 41/1448* (2013.01); *F02M 26/02* (2016.02); *F02D 2250/34* (2013.01)

(58) Field of Classification Search
  CPC ............. F02D 41/0007; F02D 41/0077; F02D 41/1448; F02D 41/145; F02M 26/02
  See application file for complete search history.

(56) References Cited

U.S. PATENT DOCUMENTS

| | | | | |
|---|---|---|---|---|
| 9,181,905 | B2* | 11/2015 | Chi | F02D 41/0007 |
| 10,677,179 | B2* | 6/2020 | Dixon | F02D 41/0072 |
| 2003/0010019 | A1 | 1/2003 | Engel et al. | |
| 2003/0023367 | A1 | 1/2003 | Avery, Jr. et al. | |
| 2008/0053088 | A1 | 3/2008 | Yanakiev | |
| 2008/0245070 | A1 | 10/2008 | Allain et al. | |
| 2008/0295513 | A1 | 12/2008 | Rollinger et al. | |
| 2012/0023932 | A1 | 2/2012 | Ge et al. | |
| 2013/0211693 | A1* | 8/2013 | Petrovic | F02B 37/013 701/104 |
| 2013/0269662 | A1* | 10/2013 | Kuhn | F02M 26/05 123/568.11 |
| 2013/0311068 | A1* | 11/2013 | Rollinger | F02D 41/0065 701/104 |
| 2014/0345255 | A1 | 11/2014 | Zhu et al. | |
| 2016/0131057 | A1* | 5/2016 | Lahti | F02D 41/0077 701/103 |
| 2016/0131089 | A1* | 5/2016 | Lahti | F02B 37/24 60/605.2 |

FOREIGN PATENT DOCUMENTS

| | | |
|---|---|---|
| EP | 3246549 A1 | 11/2017 |
| GB | 2460163 A | 11/2009 |
| WO | 2011067491 A1 | 6/2011 |

* cited by examiner

METHOD OF OPERATING AN ENGINE ASSEMBLY

CROSS REFERENCE TO RELATED APPLICATION

The present application claims priority to Great Britain patent application No. 1800098.4, entitled "A METHOD OF OPERATING A MOTOR VEHICLE", and filed on Jan. 4, 2018. The entire contents of the above-listed application are hereby incorporated by reference for all purposes.

FIELD

The present disclosure relates to a method and system for operating an engine assembly and is particularly, although not exclusively, concerned with a method of operating an engine assembly in order to improve reliability of the engine assembly.

BACKGROUND/SUMMARY

Turbochargers for engine assemblies, e.g., of motor vehicles, typically include a mechanism for adjusting the level of boost being provided by the turbocharger. For example, the turbocharger may comprise a Variable Geometry Turbine (VGT) comprising a set of adjustable vanes for controlling the flow of gases through the turbine to adjust the power provided to a compressor of the turbocharger for compressing inlet gases. Alternatively, the turbocharger may include a bypass duct configured to allow a controllable proportion of the exhaust gases to bypass the turbine.

Turbines provided within turbochargers are typically designed to operate up to a maximum inlet pressure and/or with a maximum pressure ratio between an inlet and an outlet of the turbine. Beyond the maximum inlet pressure or maximum pressure ratio, the performance of the turbine may be reduced. Furthermore, if the inlet pressure regularly exceeds the maximum design inlet pressure of the turbine or increases such that the maximum pressure ratio of the turbine is exceeded, the turbocharger may become damaged or require more intensive and/or more frequent maintenance.

When the turbocharger is controlled to adjust the level of boost provided, the pressure of exhaust gases upstream of the turbine, e.g., within an exhaust manifold of the engine assembly, may change, and may approach the maximum design pressure. For example, when the angle of the variable vanes of a VGT is adjusted and an inlet area of the VGT is reduced, the pressure of exhaust gases upstream of the VGT may increase.

Some engine assemblies include a pressure sensor configured to measure the pressure of exhaust gases within the exhaust manifold. The pressure measurement recorded by the pressure sensor may be used to control the operation of the turbocharger, e.g., within a closed feedback loop.

The exhaust manifold pressure sensor allows accurate control of the turbocharger assembly in response to changes in the exhaust manifold pressure. However, using current measurements of pressure in order to determine how the turbocharger should be controlled can lead to an undesirably long response time between the exhaust manifold pressure increasing and the turbocharger or another system of the vehicle responding. Furthermore, since the turbocharger is controlled according to a current measurement of the exhaust manifold pressure, in some arrangements, the turbocharger is only controlled to reduce the exhaust manifold pressure below the maximum design pressure, once a high pressure has been measured.

The inventors have recognized that an improved method of controlling the operation of a turbocharger assembly to prevent the exhaust manifold pressure from exceeding the maximum design pressure is desirable.

According to an aspect of the present disclosure, there is provided a method of operating an engine assembly to overcome at least a portion of the aforementioned problems. The engine assembly comprises an engine, a turbocharger assembly, a control parameter of the turbocharger assembly being controllable in order to control a level of boost provided by the turbocharger assembly, wherein the method comprises determining a desirable pressure limit of exhaust gases upstream of a turbine of the turbocharger assembly, e.g., in an exhaust manifold or a high pressure exhaust duct, predicting a desirable limit value of the control parameter to be applied to the turbocharger assembly in order to achieve the desirable pressure limit, determining an error in the desirable limit value of the control parameter, adjusting the desirable limit value of the control parameter based on the error; and controlling the operation of the turbocharger assembly such that the adjusted limit value is not exceeded. In this way, the turbocharger assembly may be operated to reduce the likelihood of decreased turbocharger performance and turbocharger damage. Consequently, the longevity of the turbocharger assembly is increased, thereby reducing turbocharger maintenance, repair, etc., over the engine's lifespan.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
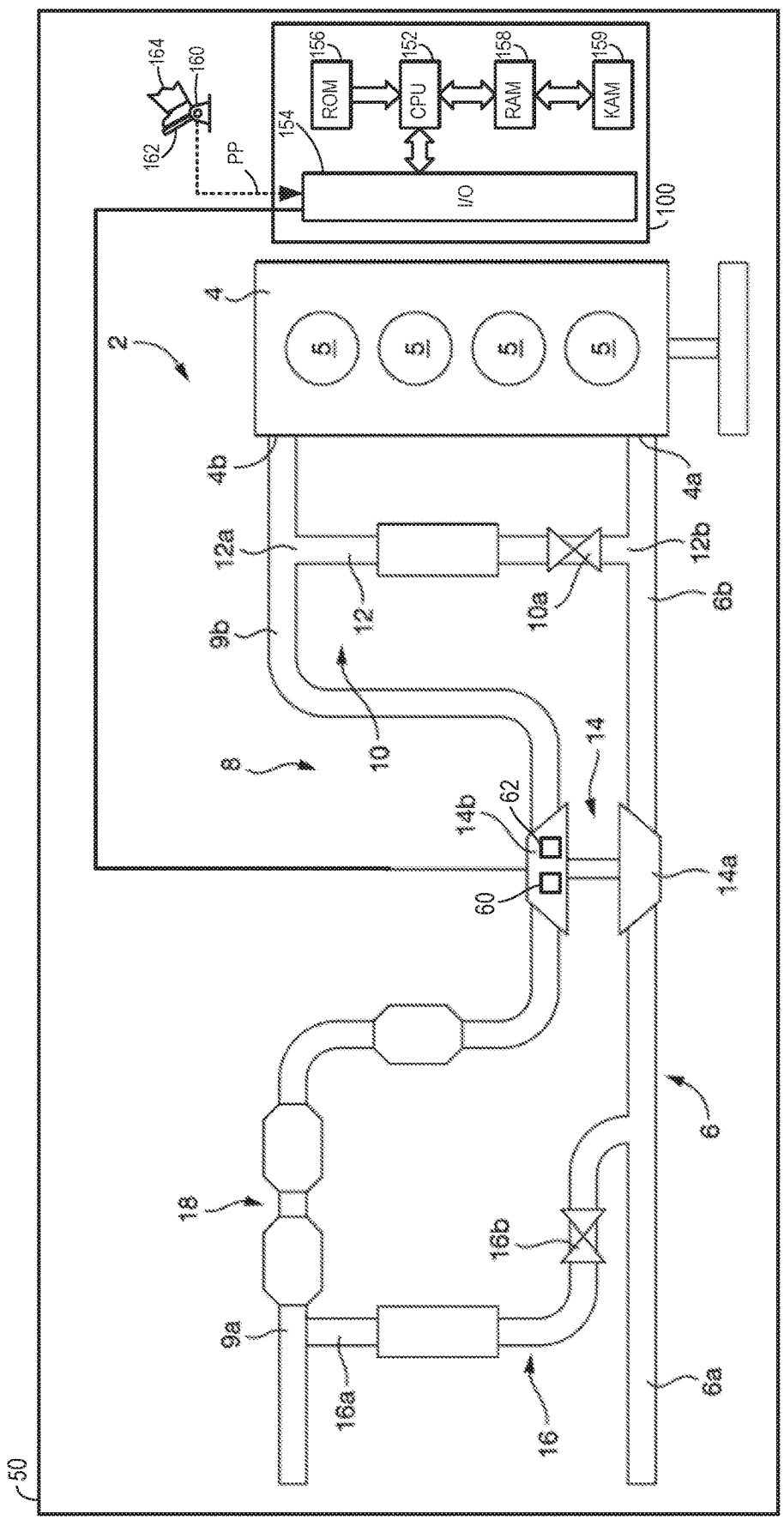
FIG. 1 is a schematic view of an engine assembly according to arrangements of the present disclosure.

According to an aspect of the present disclosure, a method for operation an engine system is provided. The method may include determining a desirable pressure limit of exhaust gases upstream of a turbine of the turbocharger assembly and predicting a desirable limit value of the control parameter to be applied to the turbocharger assembly in order to achieve the desirable pressure limit. The method may further include determining an error in the desirable limit value of the control parameter, adjusting the desirable limit value of the control parameter based on the error, and controlling the operation of the turbocharger assembly such that the adjusted limit value is not exceeded.

In one aspect, determining the error in the desirable limit value of the control parameter may comprise: predicting a current value of the control parameter based on a current pressure of exhaust gases upstream of the turbine; determining a current, e.g., measured, value of the control parameter; and determining an error between the predicted current value of the control parameter and the current value of the control parameter.

Determining the current value of the control parameter, e.g., being applied by the turbocharger assembly, may comprise measuring the control parameter.

Determining the current value of the control parameter may comprise calculating the control parameter based on a predicted current exhaust manifold pressure.

The desirable limit value of the control parameter may be determined using a data model or look-up table, e.g., based on the desirable pressure limit.

The predicted current exhaust manifold pressure may be predicted using the data model or look-up table. Using the same data model or look up table to determine the desirable limit value of the control parameter and the predicted current exhaust manifold pressure improved the accuracy with which the error can be determined.

The desirable pressure limit may be determined according to at least one of: a maximum inlet pressure limit of the turbocharger assembly; a maximum pressure ratio limit between an inlet and an outlet of the turbocharger assembly; and a maximum permitted rate of increase of the pressure of exhaust gases upstream of the turbocharger turbine.

The engine assembly may further comprise an exhaust gas recirculation (EGR) system configured to recirculate exhaust gases from a position upstream of the turbine of the turbocharger assembly, to an inlet of the engine. The maximum permitted rate of increase of the exhaust manifold pressure may be determined at least partially according to the operation of the EGR system, e.g., according to a flow rate of exhaust gases being recirculated by the EGR system. For example, the flow of exhaust gases within the EGR duct may be controlled by an EGR valve. The maximum permitted rate of increase may be determined at least partially according to a position of the EGR valve.

The method may further comprise varying the operation of the EGR system, e.g., by controlling the position of the EGR valve, such that the flow rate of recirculated exhaust gases remains substantially constant as the turbocharger assembly is controlled.

The operation of the turbocharger assembly may be controlled according to the minimum of: a desired value of the control parameter; and the adjusted limit value of the control parameter.

The method may further comprise controlling the operation of the turbocharger assembly using a closed feedback loop if the exhaust manifold pressure exceeds the desirable exhaust manifold pressure limit.

The method may comprise detecting a request for an increased amount of torque to be supplied by the engine assembly.

The method may be performed, e.g., to control the operation of the turbocharger assembly such that the adjusted limit value is not exceeded, for a predetermined period of time following the request for an increased amount of torque being detected.

The turbocharger assembly may comprise a Variable Geometry Turbine (VGT). The control parameter of the turbocharger assembly may correspond to the geometry of the VGT. For example, the control parameter may control a nozzle angle of the VGT.

The turbocharger assembly may comprise a turbocharger assembly bypass duct, configured to permit exhaust gases to bypass a turbine of the turbocharger assembly. The flow of exhaust gases through the bypass duct may be controlled by a bypass valve. The control parameter of the turbocharger assembly may correspond to the position of the bypass valve, e.g., between open and closed positions of the valve.

According to another aspect of the present disclosure, there is provided a method of operating a motor vehicle, the motor vehicle comprising: a vehicle assembly, a control parameter of the vehicle assembly being controllable in order to control the operation of the vehicle assembly, wherein the method comprises: determining a first limit value of the control parameter using a first method based on a modelled value of a first operating parameter of the vehicle assembly; determining a second limit value of the control parameter using a second method based on a measured value of the first operating parameter; determining an authority limit based on a second operating parameter of the engine assembly, wherein the authority limit defines a limit on the value of the first limit value that can be used to control the operation of the turbocharger assembly; and controlling the operation of the vehicle assembly based on the first limit value if the first limit value is within the authority limit or based on the more limiting, e.g., on the operation of the vehicle assembly, of the second limit value and the authority limit if the first limit value is outside the authority limit, e.g., such that the imposed limit value is not exceeded.

The authority limit may be a minimum value of the control parameter that is permitted to be applied by the first method. The vehicle assembly may be a turbocharger assembly, e.g., provided within an engine assembly of the motor vehicle.

According to another aspect of the present disclosure, there is provided a method of operating an engine assembly, the engine assembly comprising: an engine; a turbocharger assembly, a control parameter of the turbocharger assembly being controllable in order to control a level of boost provided by the turbocharger assembly, wherein the method comprises: determining a first limit value of the control parameter using a first method, based on one of a modelled and measured value of exhaust manifold pressure; determining a second limit value of the control parameter using a second method based on the other of the modelled and measured value of exhaust manifold pressure; determining an authority limit based on an operating parameter of the engine assembly, wherein the authority limit defines a limit on the value of the first limit value that can be used to control the operation of the turbocharger assembly; and controlling the operation of the turbocharger assembly based on the first limit value if the first limit value is within the authority limit or based on the more limiting, e.g., on the operation of the turbocharger assembly to provide boost for the engine, of the second limit value and the authority limit if the first limit value is outside the authority limit, e.g., such that the imposed limit value is not exceeded. In this way the operation of the turbocharger may be limited according to the first limit value determined using the first method to the extent of the authority limit. The authority limit may be a minimum value of the control parameter that the first method is permitted to limit the control parameter to.

The method may comprise determining a maximum permitted value of the control parameter based on a further operating parameter of the engine assembly. For example, the maximum permitted value may be determine based on a running speed and/or torque output of the engine assembly.

The authority limit may be defined relative to the maximum permitted value. In other words, the authority limit may define a maximum difference between the maximum permitted value and the first limit value, within which the operation of the turbocharger assembly can be limiting by the first method.

The first limit value may be determined using a data model or look up table. The second limit value may be determined using a closed loop feedback method including proportion, integral and/or differential control. For example, a pressure of exhaust gases at an inlet of the turbocharger turbine, e.g., within the exhaust manifold, may be fed back and compared with a maximum desirable inlet pressure.

The first and second limit values may be determined using separate controllers or modules. For example, the closed loop feedback method may be performed using a closed-loop feedback controller or module.

The authority limit may be determined based on one or more of: engine torque, e.g., rate of change of engine torque; engine torque requested by a driver; exhaust gas pressure at an inlet of a turbine of the turbocharger; maximum exhaust gas pressure at the inlet of the turbine; turbocharger boost level; flow rate of exhaust gas though the turbine; and the maximum permitted value of the control parameter.

The authority limit may be determined based on rate of change of engine torque requested by a driver.

The first method may be the above-mentioned method of operating an engine assembly.

According to another aspect of the present disclosure, there is provided software which, when executed by a computing device, causes the computing device to perform any of the above-mentioned methods.

According to another aspect of the present disclosure, there is provided an engine assembly for a motor vehicle, the engine assembly comprising: an engine; a turbocharger assembly, a control parameter of the turbocharger assembly being controllable in order to control a level of boost provided by the turbocharger assembly; and one or more controllers configured to perform any of the above-mention methods.

The engine assembly may further comprise an Exhaust Gas Recirculation (EGR) system configured to recirculate exhaust gases from a position upstream of a turbine of the turbocharger assembly, to an inlet of the engine.

A motor vehicle may comprise the above-mentioned engine assembly.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

With reference to FIG. 1, an engine assembly 2 for a vehicle 50, e.g., a motor vehicle, comprises an engine 4, an intake system 6, an exhaust system 8, a High Pressure (HP) Exhaust Gas Recirculation (EGR) system 10 and a turbocharger assembly 14.

As depicted in FIG. 1, the intake system 6 comprises a Low Pressure (LP) intake duct 6a provided upstream of a compressor 14a of the turbocharger assembly. The compressor 14a is configured to increase the pressure of inlet air arriving at the compressor 14a from the low pressure inlet duct 6a to a boost pressure level. Inlet air that has been compressed by the compressor 14a enters a high pressure inlet duct 6b. Inlet gases flow within the HP inlet duct 6b to an inlet manifold 4a of the engine and may be drawn into cylinders 5 of the engine 4.

The inlet gases are mixed with fuel within the cylinders 5 of the engine 4 and the fuel is combusted to provide power to drive the engine 4. Exhaust gases produced through this combustion are exhausted from the engine 4 via an exhaust manifold 4b into a high pressure exhaust duct 9b. Exhaust gases may flow through the HP exhaust duct 9b to a turbine 14b of the turbocharger assembly 14. The exhaust gases may be expanded through the turbine 14b to reach a low pressure exhaust duct 9a. The turbine 14b may be coupled to the compressor 14a via a shaft. Power may be generated by the turbine 14b, by expanding the exhaust gases through the turbine, to power the compressor 14a.

In the arrangement shown in FIG. 1, the turbine 14b is a Variable Geometry Turbine (VGT) comprising variable inlet vanes 60, which are arranged at an angle relative to a rotor 62 of the turbine. By varying the angle of the inlet vanes relative to the rotor, the power generated by the turbine 14b, and hence, the power provided to the compressor 14a may be controlled. The level of boost provided by the turbocharger assembly 14 may therefore be controlled by varying the angle of the variable inlet vanes. The engine assembly 2 may comprise a controller 100 for controlling the operation of the VGT, e.g., by controlling the position of the vanes of the VGT.

Figure 2:
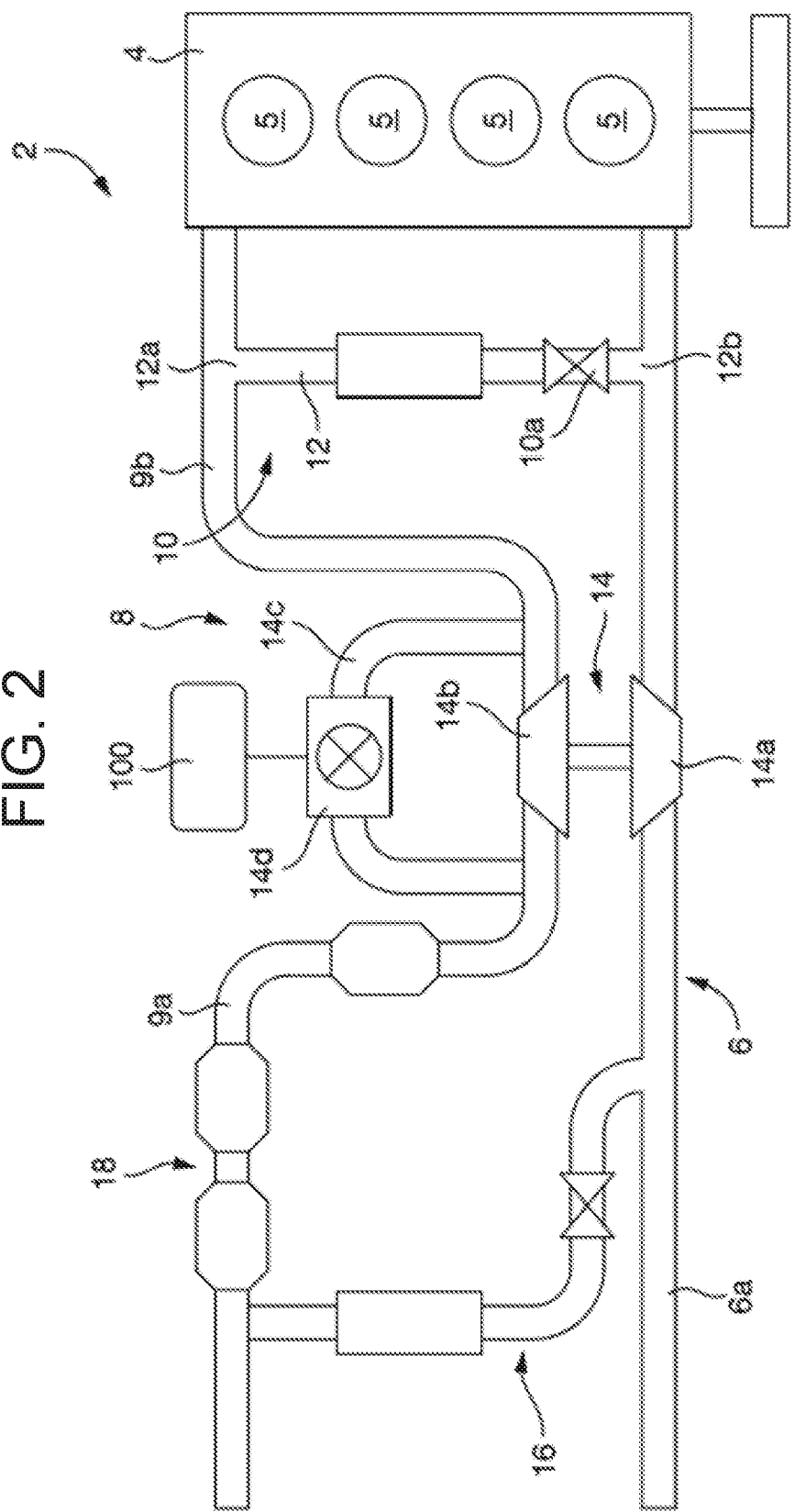
FIG. 2 is a schematic view of an engine assembly according to another arrangement of the present disclosure.

In some arrangements, the geometry of the turbine 14b may be fixed and the level of boost provided by the turbocharger assembly 14 may be controlled by an alternative means. For example, as shown in FIG. 2, the turbocharger assembly 14 may comprise a bypass duct 14c configured to allow a portion of the exhaust gases to flow from the HP exhaust duct 9b to the LP exhaust duct 9a without passing through the turbine 14b. The flow of exhaust gases passing through the bypass duct 14c may be controlled by a bypass valve 14d, such as a wastegate. By allowing a portion of the exhaust gases to bypass the turbine 14b, the power generated by the turbine 14b, and hence, the power available to drive the compressor 14a may be reduced. The level of boost provided by the turbocharger assembly 14 may therefore be reduced.

In the arrangement shown in FIG. 2, the controller 100 may be configured to control the position of the bypass valve 14d.

In other arrangements, the exhaust system 8 may comprise the VGT 14b and may also comprise the bypass duct 14c and bypass valve 14d. In this arrangement, the power generated by the turbine 14b may be controlled by varying the geometry of the turbine 14b and/or by varying the position of the bypass valve 14d.

Increasing the pressure of inlet air entering the engine 4, e.g., the level of boost, allows a greater quantity of air to be drawn into the cylinders of the engine, which in turn allows more fuel to be mixed with the air and combusted. Burning more fuel within the engine 4 allows the engine to develop more power and torque to drive the vehicle. When a driver of the vehicle requests more power to be supplied by the engine 4, for example by pressing an accelerator pedal 162 of the vehicle, the turbocharger assembly 14 may be controlled to increase the level of boost provided by the turbocharger assembly, and hence, the power and torque generated by the engine.

The engine assembly 2 may further comprise a Low Pressure (LP) EGR assembly 16 comprising an LPEGR duct 16a configured to recirculate a portion of the low pressure exhaust gases back to the intake system 6, e.g., to the low pressure inlet duct 6a. Flow of exhaust gases within the LPEGR duct 16a may be controlled by an LPEGR valve 16b.

The exhaust system 8 may further comprise one or more exhaust after-treatment devices 18 provided downstream of the turbine 14b. For example, the exhaust system 8 may comprise a lean NOx trap 18, a particulate filter 18 and/or a selective catalytic reduction device 18. The exhaust after-treatment devices may be configured to reduce the concentrations of polluting substances present within the exhaust gases.

One or more of the exhaust after-treatment devices 18 may be controllable, e.g., to adjust the efficiency with which they remove polluting substances from the exhaust gases. Controlling the operation of the exhaust after-treatment devices may affect the mass flow rate of exhaust gases through the exhaust system 8, and hence, through the turbine 14b.

With reference to FIGS. 1 and 2, the HP EGR system 10 comprises an EGR duct 12 configured to recirculate a portion of the exhaust gases leaving the engine 4 back to the intake system 6. The recirculated exhaust gases mix with inlet air within the intake system 6 and may be drawn back into the engine 4. A first end 12a of the HP EGR duct may be coupled to and in fluid communication with the HP exhaust duct 9b, e.g., a position on the exhaust system 8 upstream of the turbine 14b. For example, the first end 12a of the HP EGR duct may be coupled to the exhaust manifold 4b. A second end 12b of the HP EGR duct may be coupled to and in fluid communication with the HP intake duct 6b, e.g., a position on the intake system 6 between the compressor 14a and the engine 4.

The flow of exhaust gases within the HP EGR duct 12 may be controlled by an HP EGR valve 10a. The flow rate of the exhaust gases may depend on the position of the HP EGR valve 10a and the pressure difference between the first and second ends 12a, 12b of the HP EGR duct 12. For example, in the arrangement shown in FIGS. 1 and 2, when the pressure of exhaust gases within the HP exhaust duct 9b increases relative to the pressure of inlet gases within the HP inlet duct 6b, the flow rate of exhaust gases within the HP EGR duct 12 may increase for a given position of the HP EGR valve 10a.

Increasing the flow rate of EGR gases, either due to a change in the position of the HP EGR valve or a change in the pressure difference across the HP EGR duct 12, may lead to a reduction in the quantity of inlet air present in the intake gases being drawn into the cylinders of the engine 4, thereby reducing the quantity of fuel which may be combusted within the engine. The power generated by the engine 4 may therefore be reduced. Controlling the power generated by the engine in this way may be beneficial, as it may lead to a reduction in the production of pollutants, such as nitrous oxides, compared to controlling the engine 4 in other ways, for example by using an inlet throttle.

As described above, when increased power or torque is requested by a driver of the vehicle, the operation of the turbocharger assembly 14 may be controlled to increase the level of boost provided. In the arrangement depicted in FIG. 1, controlling the turbocharger assembly to increase the level of boost may be achieved by adjusting the angle of the variable vanes of the turbine 14b.

Adjusting the angle of the vanes may reduce the area through which exhaust gases passing through the turbine 14b may flow. Hence, following control of the turbine in this way, the pressure of the exhaust gases upstream of the turbine, e.g., within the exhaust manifold 4b, may increase.

Controller 100 is shown in FIG. 1 as a conventional microcomputer including: microprocessor unit 152, input/output ports 154, read-only memory 156, random access memory 158, keep alive memory 159, and a conventional data bus. Controller 100 is configured to receive various signals from sensors coupled to the engine 4 and send command signals to actuators in components in the vehicle, such as a throttle (not shown). Additionally, the controller 100 is also configured to receive pedal position (PP) from a pedal position sensor 160 coupled to a pedal 162 actuated by an operator 164. Therefore, in one example, the controller 100 may receive a pedal position signal and adjust actuators in the throttle based the pedal position signal to vary engine speed. It will be appreciated that other components receiving command signals from the controller may function in a similar manner. It will also be appreciated that the controller 100 in FIG. 2 may also include the components described above and included in the controller 100, shown in FIG. 1, in some examples. It will also be appreciated that the controller 100 may be configured to implement one or more of the methods, control strategies, etc., described herein.

Similarly, in the arrangement shown in FIG. 2, controlling the turbocharger assembly to increase the level of boost may be achieved by closing the wastegate 14d. Closing the wastegate may reduce the flow area available for exhaust gases to bypass the turbine 14b, which may lead to an increase in the pressure of exhaust gases within the HP exhaust duct 9b and/or the exhaust manifold 4b.

In some arrangements, when a high level of torque is demanded from the engine assembly 2 and the turbocharger assembly 14 is controlled in response to the torque demand to provide an increased level of boost, the pressure of exhaust gases at an inlet of the turbine 14b of the turbocharger assembly, e.g., within the exhaust manifold 4b and/or the high pressure exhaust duct 9b, may approach a maximum design pressure of the turbine 14b. Additionally or alternatively, a ratio of pressure between the inlet and an outlet of the turbine 14b may approach a maximum design ratio. As described above, if the maximum design pressure or maximum design pressure of the turbine 14b is exceeded, the performance of the turbine may be reduced, the turbocharger may become damaged, and/or the turbocharger may require more intensive and/or more frequent maintenance.

Figure 3:
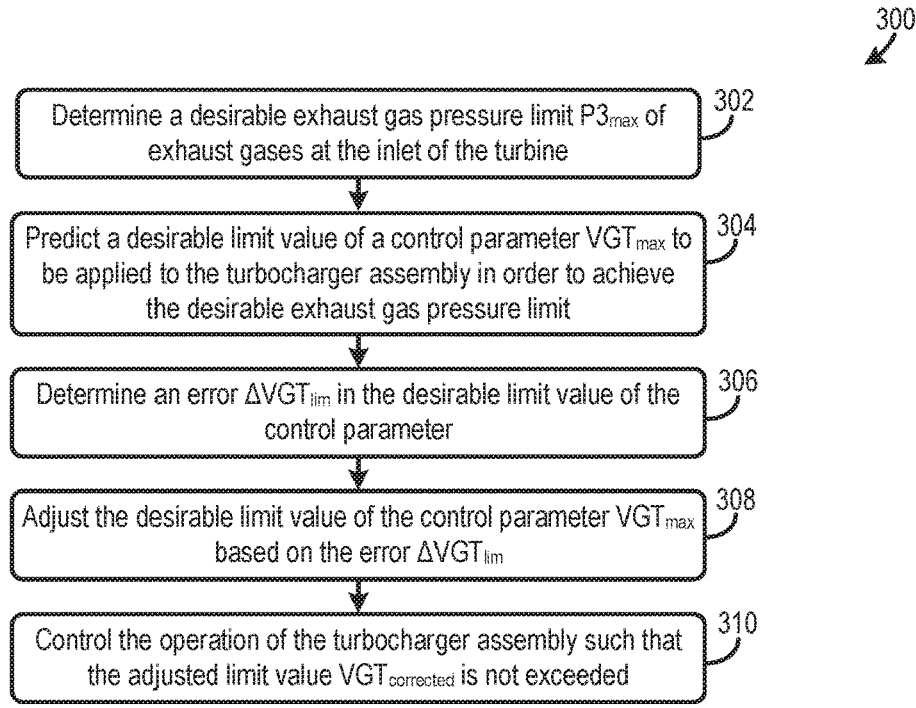
FIG. 3 is a flow chart illustrating a method of operating an engine assembly according to an arrangement of the present disclosure.

With reference to FIG. 3, in order to reduce the risk of the pressure of exhaust gases at the turbine inlet exceeding the maximum design pressure or the pressure ratio between the inlet and outlet of the turbine exceeding the maximum design ratio, the turbocharger assembly may be controlled, e.g., by the controller 100, according to a method 300.

The method 300 comprises a first step 302, in which a desirable exhaust gas pressure limit $P3_{max}$ of exhaust gases at the inlet of the turbine is determined. The desirable exhaust gas pressure limit may be determined based on at least one of the maximum design pressure, the maximum design ratio and one or more other pressure limitations, e.g., dynamic pressure limitation based on the operating conditions of the engine assembly.

In a second step 304 of the method 300, a desirable limit value of a control parameter $VGT_{max}$ to be applied to the turbocharger assembly 14 in order to achieve the desirable exhaust gas pressure limit is predicted. The control parameter may correspond to any desirable control parameter of the turbocharger that can be applied to control the operation of the turbocharger in order to affect the pressure of exhaust gases at the inlet of the turbine 14b. For example, the control parameter may correspond to the angle of a variable vane of the VGT 14b or the position of the turbocharger bypass valve 14d.

Figure 4:
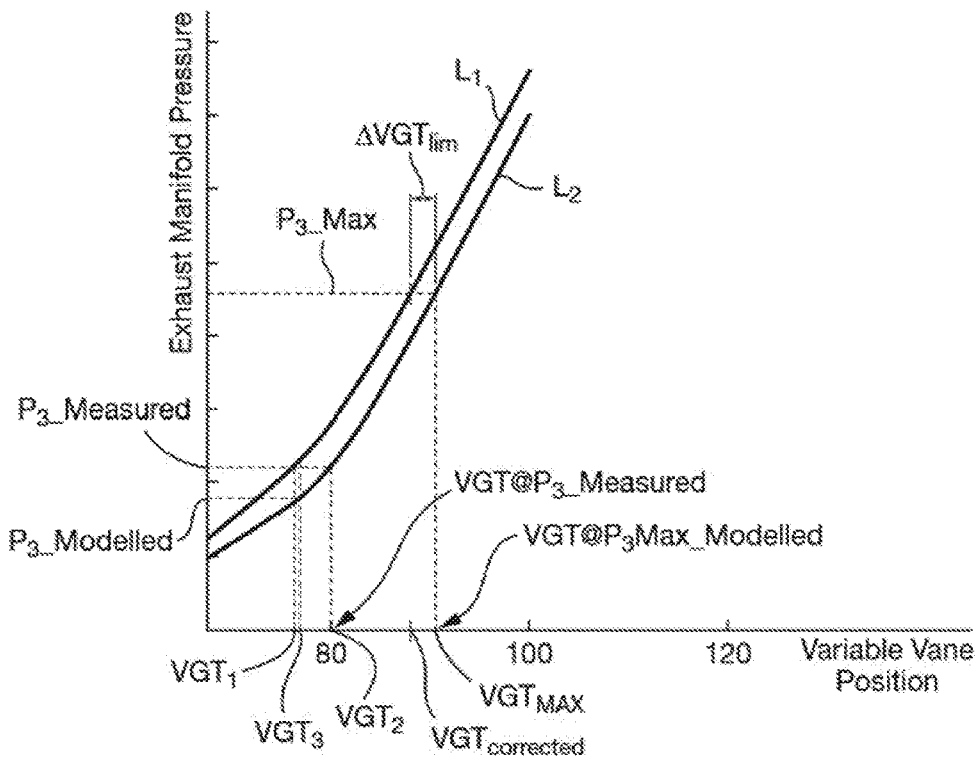
FIG. 4 is a graph of measured and modelled exhaust manifold pressure that is useful for understanding the method illustrated in FIG. 3.

In FIG. 4, line L1 is a plot of actual exhaust manifold pressure on the vertical axis against variable vane position on the horizontal axis and line L2 is a plot of modelled exhaust manifold pressure on the vertical axis against variable vane position on the horizontal axis determined from a data model relating VGT position to exhaust manifold pressure.

The desirable limit value $VGT_{max}$ may be determined by referring to a data model or look-up table. For example, as depicted in FIG. 4, the desirable limit value $VGT_{max}$ is determined by using the desirable exhaust gas pressure limit $P3_{max}$ as an input to the model relating VGT position to exhaust manifold pressure.

In a third step 306 of the method 300, shown in FIG. 3, an error $\Delta VGT_{lim}$ in the desirable limit value of the control parameter is determined.

As illustrated in FIG. 4 and with reference to equation 1 below, the error $\Delta VGT_{lim}$ may be determined by comparing a measured value of the current control parameter VGT1, e.g., measured using a vane angle sensor and/or a bypass valve position sensor of the turbocharger assembly, with a predicted current value of the control parameter VGT2. The predicted current value of the control parameter VGT2 may be determined by using a value of exhaust gas pressure $P3_{measured}$, measured using an exhaust manifold pressure sensor, as an input to the model relating VGT position to exhaust manifold pressure.

$$\Delta VGT_{lim} = gain*(VGT2-VGT1) \quad (1)$$

Alternatively, the error $\Delta VGT_{lim}$ may be determined by comparing an estimated value of the control parameter VGT3 with the predicted current value of the control parameter. As illustrated in FIG. 4, the estimated value of the control parameter VGT3 is calculated by using a modelled value of the exhaust gas pressure $P3_{modelled}$ as an input to the model relating VGT position to exhaust manifold pressure. As depicted in FIG. 4, using the estimated value of the control parameter VGT3 results in substantially the same value of the error $\Delta VGT_{lim}$ being calculated.

As indicated in Equation (1), in some arrangements, the error $\Delta VGT_{lim}$ may be multiplied by a gain value. The gain may be a constant value applied at all operating conditions of the engine assembly 2. Alternatively, the gain value may be adjusted according to a current operating parameter of the turbocharger assembly 14 or the engine assembly 2. For example, the gain value may be determined according to the current exhaust gas pressure at the turbine inlet.

In a fourth step 308 of the method 300, shown in FIG. 3, the desirable limit value of the control parameter $VGT_{max}$ is adjusted based on the error $\Delta VGT_{lim}$, e.g., by adding/subtracting the error to/from the desirable limit value, to determine a corrected limit value, see equation (2) below.

$$VGT_{corrected} = VGT_{max} - \Delta VGT_{lim} \quad (2)$$

In a fifth step 310 of the method 300, the operation of the turbocharger assembly 14 is controlled such that the adjusted limit value $VGT_{corrected}$ is not exceeded. For example, the turbocharger assembly may be controlled using the minimum of the adjusted desirable limit value $VGT_{corrected}$ and a desirable value of the control parameter, e.g., determined by a controller in order to provide a desirable turbocharger boost level.

By controlling the turbocharger assembly 14 based on a modelled value of exhaust pressure, the response time of the control may be shorter than a method that relies on measurements from a pressure sensor to establish whether a pressure limit has been reached. Furthermore, by controlling the turbocharger assembly 14 based on a modelled value of exhaust pressure, the control of the turbocharger assembly can be adjusted to prevent the pressure limit being exceeded before the pressure limit is reached, e.g., when the model determines that a value of the control parameter may lead to the pressure limit being exceeded.

The method 300 may further comprise controlling the operation of the turbocharger using a closed feedback loop, e.g., in which the pressure of exhaust gases upstream of the turbocharger turbine is fed back to the controller 100 or another controller, such as a closed loop feedback controller, if the pressure of exhaust gases upstream of the turbine exceeds the desirable pressure limit. The pressure sensor and the feedback controller can thereby be used as a fall back in the case that the predicted values or models used within the method 300 are inaccurate.

In some arrangements, the method 300 may comprise a step in which a request for an increased amount of torque to be supplied by the engine assembly is detected. For example, if the driver of the vehicle presses the accelerator pedal of the vehicle.

When the request for an increased amount of torque is detected, the steps of the method 300 described above may be performed, in order to control the operation of the turbocharger assembly 14 such that the desirable exhaust gas pressure limit is not exceeded. The method may be performed to control the operation of the turbocharger assembly 14 for a predetermined period of time following the detection of the request.

Prior to the request being detected, the operation of the turbocharger assembly may be controlled using a previously proposed method, e.g., using a closed loop feedback controller considering a pressure measurement of exhaust gases upstream of the turbine. After the predetermined period of time, the turbocharger assembly may return to being controlled using the previously proposed method. Alternatively, the method 300 may be performed repeatedly, e.g., regardless of the torque demand.

The increase in pressure of the exhaust gases upstream of the turbine 14b, due to the change in the operation of the turbocharger assembly, may occur at a higher rate than an increase in pressure of the inlet gases within the HP intake duct 6b, due to increased power being supplied to the compressor 14a, e.g., by the turbine 14b. This may result in a change in the pressure difference between the first and second ends 12a, 12b of the HP EGR duct 12, which may affect, e.g., increase, the flow rate of EGR gases within the HP EGR duct.

Hence, when the driver requests an increase in the power supplied by the engine, the interaction between the operation of the turbocharger assembly 14 and the HP EGR system 10, may lead to an undesirable decrease in the power being provided by the engine 4 due to an increase in the rate of EGR.

The position of the HP EGR valve 10a may be controlled at least partially based on the pressure difference across the HP EGR duct 12, hence the HP EGR valve 10a may be controlled to compensate for this effect. However, if the driver requests a rapid increase in power to be supplied by the engine, the HP EGR valve 10a may not be controlled quickly enough to sufficiently compensate for the change in pressure difference across the HP EGR duct 12.

Figure 5:
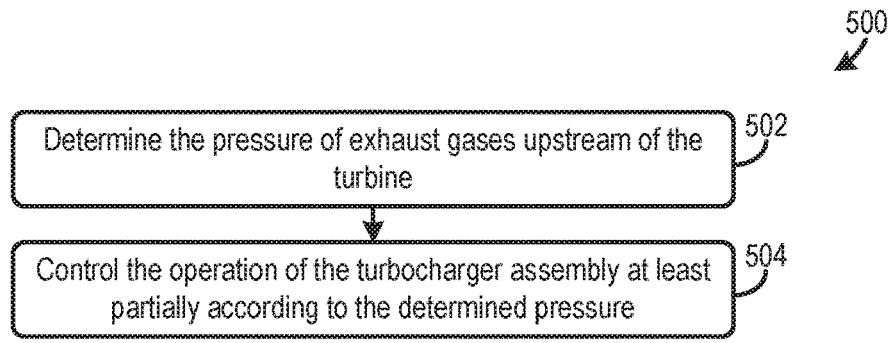
FIG. 5 is a flow chart illustrating a method of operating an engine assembly according to another arrangement of the present disclosure.

With reference to FIG. 5, in order to prevent an undesirable decrease in engine power, a method 500 of operating an engine assembly, according to arrangements of the present disclosure, may be performed.

The method comprises a first step 502 in which the pressure of exhaust gases upstream of the turbine 14b, e.g., within the HP exhaust duct 9b or the exhaust manifold 4b, is determined. In a second step 504, the operation of the turbocharger assembly may be controlled at least partially according to the determined pressure.

The change in the pressure difference across the HP EGR duct 12 that may result from a change in the operation of the turbocharger assembly 14 may depend on the pressure of the exhaust gases upstream of the turbine 12b, e.g., within the exhaust manifold 4b of the engine. Hence, by controlling the operation of the turbocharger assembly 14 at least partially according to the exhaust manifold pressure, an undesirable reduction in the power provided by the engine may be avoided.

The pressure of the exhaust gases upstream of the turbine 14b may be determined using the pressure sensor provided on the HP exhaust duct 9b and/or the exhaust manifold 4b. Alternatively, the pressure of exhaust gases upstream of the turbine 14b may be determined using the data model or look-up table.

In one arrangement of the present disclosure, the data model used allows the pressure of exhaust gases upstream of the turbine 14b to be determined based on the geometry of the VGT 14b and/or position of the bypass valve 14d, the mass flow rate of exhaust gases through the turbine 14b and the pressure downstream of the turbine. However in other arrangements, it is envisaged that a data model or look-up table may be applied that allows the pressure of exhaust gases upstream of the turbine 14b to be determined based on a combination of the geometry of the VGT 14b and/or position of the bypass valve 14d, the mass flow rate through the turbine, the pressure downstream of the turbine, the running speed of the engine, the position of the HP EGR valve 10b, the position of a LP EGR valve 16b, and/or any other suitable parameters of the engine assembly 2.

The method 500 may further comprise determining a maximum permitted rate of increase in pressure of the exhaust gases upstream of the turbine, in some examples. The operation of the turbocharger may be controlled such that the rate of increase in pressure of the exhaust gases upstream of the turbine is maintained at or below the maximum permitted rate.

The maximum permitted rate of increase in pressure may be determined such that the HP EGR system 10 can be controlled to adequately compensate for changes in pressure difference across the HP EGR duct 12. For example, by varying the position of the HP EGR valve 10a to maintain the flow rate of recirculated exhaust gases within the HP EGR duct 12 at a desirable level.

The operation of the turbocharger assembly 14 may be controlled such that the pressure of exhaust gases upstream of the turbine 12b is maintained at or below the maximum permitted value. For example, the maximum permitted rate of increase in pressure may be used in the first step of the method 300 in order to determine the desirable exhaust gas pressure limit used within the method 300 for controlling the operation of the turbocharger assembly.

In some arrangements, a nominal maximum value of the control parameter to be applied to control the operation of the turbocharger assembly 14, e.g., the angle of the vane of the VGT 14a or the setting of the turbocharger bypass valve 14d, may be determined based on a function of one or more operating parameters of the engine assembly. For example, the nominal maximum value of the control parameter may be determined based on speed and/or power of the engine assembly.

The extent to which the adjusted desirable limit value, e.g., determined in the fourth step 308 of the method 300, can be applied to override the nominal maximum value, e.g., to impose a more restrictive setting on the turbocharger assembly 14, may be determined based on one or more operating parameters of the engine assembly, such as the torque, demanded torque and/or exhaust manifold pressure.

In this way, the adjusted desirable limit value determined using method 300 may be used to control the turbocharger assembly 14 in some desirable circumstances, e.g., in which there is a high demand for torque, or the exhaust manifold pressure is greater than a limit pressure, e.g., the desirable exhaust gas pressure limit. In other circumstances, it may be determined that the adjusted desirable limit value may be too restrictive and another control parameter calculated using another method and/or by a different controller, such as a closed loop feedback controller, may be applied to control the turbocharger assembly 14.

Figure 6:
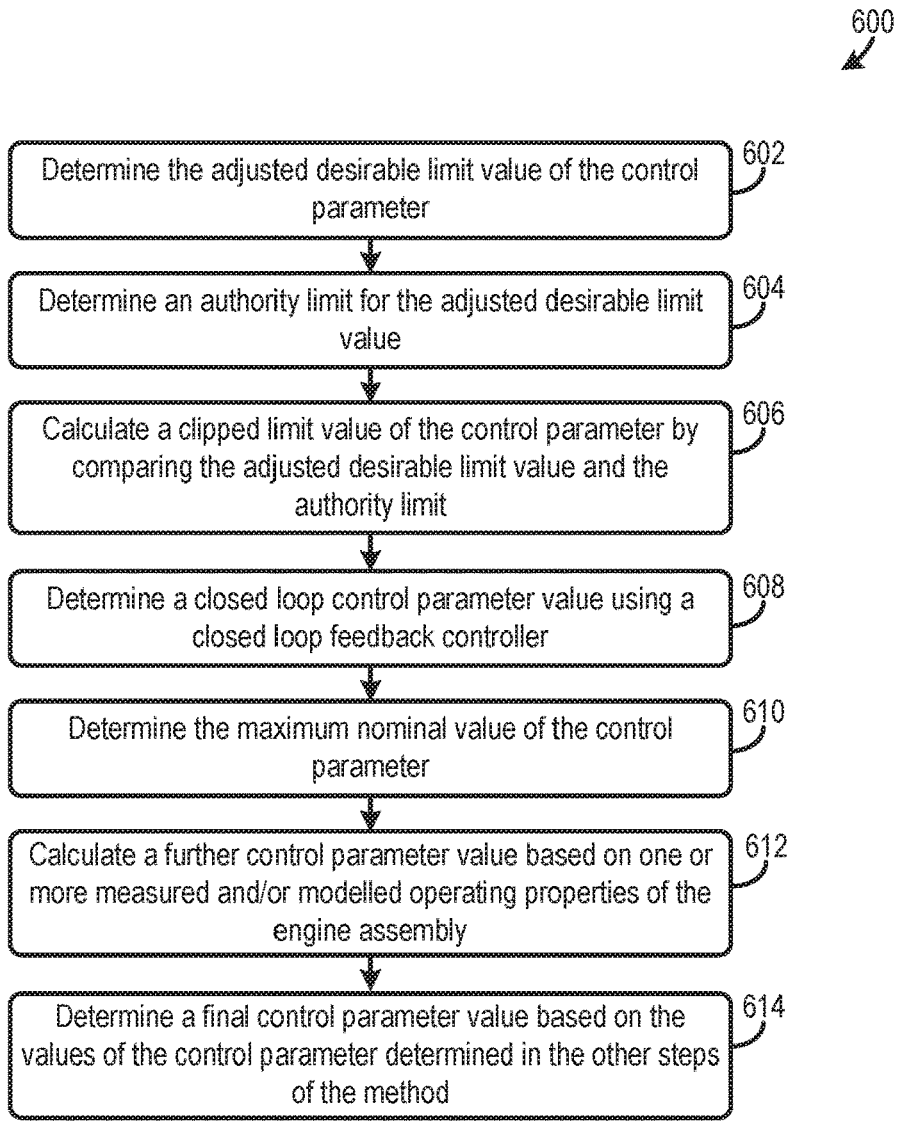
FIG. 6 is a flow chart illustrating a method of operating an engine assembly according to another arrangement of the present disclosure.

With reference to FIG. 6, according to some arrangements of the present disclosure, the operation of the turbocharger turbine 14b and/or the turbocharger bypass valve 14d is controlled using a method 600, in which a selection is made from a plurality of control parameters and control parameter limits in order to control the operation of the turbocharger assembly 14.

In a first step 602 of the method 600, the adjusted desirable limit value of the control parameter is determined, e.g., using the method 300 described above.

In a second step 604, an authority limit for the adjusted desirable limit value is determined. The authority limit may be determined based on a function of one or more operating parameters of the engine assembly. For example, the authority limit may be based on a function of engine torque request, e.g., rate of change of torque in time, and a difference between the exhaust pressure and the maximum design pressure.

The authority limit may be defined as a minimum value of the control parameter that can be applied as a limit value on the control the turbocharger assembly 14, e.g., by the method 300. In other words, the authority limit may be a minimum value of the adjusted desirable limit value $VGT_{corrected}$ that can be applied by the method 300 to control the operation of the turbocharger assembly. Alternatively, the authority limit may be defined as a maximum permitted difference between the nominal maximum value of the control parameter and the adjusted desirable limit value.

In a third step 606 a clipped limit value of the control parameter is calculated by comparing the adjusted desirable limit value, the authority limit, and optionally the nominal maximum value. For example, when the authority limit defines the minimum authorized value of the control parameter, the clipped limit value is calculated by taking the maximum of the adjusted desirable limit value and the authority limit.

In a fourth step 608, a closed loop control parameter value is determined using a closed loop feedback controller. The closed loop control parameter value may be based on a measured value of the exhaust pressure, e.g., exhaust manifold pressure, and the maximum design pressure of the turbocharger.

In a fifth step 610, the maximum nominal value of the control parameter is determined, as described above (if not already available from determining the authority limit or clipped limit value).

The method 600 may comprise a sixth step 612, in which a further control parameter value is calculated based on one or more measured and/or modelled operating properties of the engine assembly, such as engine speed, engine load, inlet and/or exhaust pressure, and/or any other operating property of the engine assembly.

In a seventh step 614 of the method 600 a final control parameter value is determined based on the values of the control parameter determined in the other steps of the method. For example, the final limit value may be determined as the minimum value of any of the clipped limit value, the closed loop control parameter value, the maximum nominal value, and/or the further control parameter value.

The final limit value may be used to control the operation of the turbocharger assembly, e.g., such that the value of the control parameter does not exceed the limit value.

The method 600 provides a way of smoothly transitioning between methods of controlling the limit on the operation of the turbocharger assembly, such as the method 300 and a method using closed loop feedback control, depending on which of the methods is considered to be most appropriate for the present operating regime of the engine assembly. For example, during dynamic maneuvers, the method 300 can be used to reduce the risk of the turbine inlet pressure limit being exceeded and in steady state conditions, closed loop feedback control can be used to accurately maintain the turbine inlet pressure as a desired value.

The technical effect of providing the methods for controlling turbocharger operation described herein is to reduce the likelihood of decreased turbocharger performance and turbocharger damage. Consequently, the longevity of the turbocharger assembly is increased, thereby reducing turbocharger maintenance, repair, etc., over the engine's lifespan. The methods for operating the turbocharger assembly, described herein, may also reduce control delays in turbocharger operation which may lead to overpressure conditions in the turbocharger.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

It will be appreciated that the configurations disclosed herein are exemplary in nature, and that these specific embodiments are not to be considered in a limiting sense, because numerous variations are possible. For example, the above technology can be applied to V-6, I-4, I-6, V-8, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine assembly, the engine assembly comprising:
   an engine; and
   a turbocharger assembly, wherein a control parameter of the turbocharger assembly is controllable in order to control a level of boost provided by the turbocharger assembly, and wherein the method comprises:
   determining a desirable pressure limit of exhaust gases upstream of a turbine of the turbocharger assembly;
   predicting a desirable limit value of the control parameter to be applied to the turbocharger assembly in order to achieve the desirable pressure limit;
   determining an error in the desirable limit value of the control parameter; predicting a current value of the control parameter based on a current pressure of exhaust gases upstream of the turbine; determining a current value of the control parameter; and determining the error in the desirable limit value of the control parameter as being between the predicted current value of the control parameter and the current value of the control parameter;
   adjusting the desirable limit value of the control parameter based on the error; and
   controlling operation of the turbocharger assembly such that the adjusted desirable limit value is not exceeded.

2. The method of claim 1, wherein determining the current value of the control parameter comprises calculating the control parameter based on a predicted current exhaust manifold pressure.

3. The method of claim 1, wherein the desirable pressure limit is determined according to one or more of:
   a maximum inlet pressure limit of the turbocharger assembly;
   a maximum pressure ratio limit between an inlet and an outlet of the turbocharger assembly; and
   a maximum permitted rate of increase of a pressure of exhaust gases upstream of the turbine.

4. The method of claim 3, wherein the engine assembly further comprises an Exhaust Gas Recirculation (EGR) system configured to recirculate exhaust gases from a position upstream of the turbine of the turbocharger assembly, to an inlet of the engine, wherein the maximum permitted rate of increase of the pressure of exhaust gases upstream of the turbine is determined at least partially according to the operation of the EGR system.

5. The method of claim 4, wherein the method further comprises:
varying the operation of the EGR system such that a flow rate of recirculated exhaust gases remains substantially constant as the turbocharger assembly is controlled.

6. The method of claim 1, wherein the operation of the turbocharger assembly is controlled according to a minimum of:
a desired value of the control parameter; and
the adjusted desirable limit value of the control parameter.

7. The method of claim 1, wherein the method further comprises controlling the operation of the turbocharger assembly using a closed feedback loop if a pressure of the exhaust gases upstream of the turbine exceeds the desirable pressure limit of the exhaust gases upstream of the turbine.

8. The method of claim 1, further comprising detecting a request for an increased amount of torque to be supplied by the engine assembly.

9. The method of claim 8, wherein the method is performed for a predetermined period of time following the request for an increased amount of torque being detected.

10. The method of claim 1, wherein the turbocharger assembly comprises a Variable Geometry Turbine (VGT) and wherein the control parameter of the turbocharger assembly corresponds to the geometry of the VGT.

11. The method of claim 1, wherein the turbocharger assembly comprises a turbocharger assembly bypass duct, configured to permit exhaust gases to bypass a turbine of the turbocharger assembly, wherein a flow of exhaust gases through the bypass duct is controlled by a bypass valve; and wherein the control parameter of the turbocharger assembly corresponds to a position of the bypass valve.

12. The method of claim 1, where the method is performed by software which, when executed by a computing device, causes the computing device to perform the method.

13. An engine assembly comprising:
an engine;
a turbocharger assembly, a control parameter of the turbocharger assembly being controllable in order to control a level of boost provided by the turbocharger assembly; and
one or more controllers configured to:
determine a desirable pressure limit of exhaust gases upstream of a turbine of the turbocharger assembly;
predict a desirable limit value of the control parameter to be applied to the turbocharger assembly in order to achieve the desirable pressure limit; predicting a current value of the control parameter based on a current pressure of exhaust gases upstream of the turbine; determining a current value of the control parameter; and determining the error in the desirable limit value of the control parameter as being between the predicted current value of the control parameter and the current value of the control parameter;
determine an error in the desirable limit value of the control parameter;
adjust the desirable limit value of the control parameter based on the error; and
control operation of the turbocharger assembly such that the adjusted desirable limit value is not exceeded.

14. The engine assembly of claim 13, wherein the engine assembly is included in a motor vehicle.

15. A method of operating an engine assembly, the engine assembly comprising:
an engine; and
a turbocharger assembly, a control parameter of the turbocharger assembly being controllable in order to control a level of boost provided by the turbocharger assembly, wherein the method comprises:
determining a desirable pressure limit of exhaust gases upstream of a turbine of the turbocharger assembly;
predicting a desirable limit value of the control parameter to be applied to the turbocharger assembly in order to achieve the desirable pressure limit;
determining an error in the desirable limit value of the control parameter; predicting a current value of the control parameter based on a current pressure of exhaust gases upstream of the turbine; determining a current value of the control parameter; and determining the error in the desirable limit value of the control parameter as being between the predicted current value of the control parameter and the current value of the control parameter;
adjusting the desirable limit value of the control parameter based on the error; and
controlling the operation of the turbocharger assembly such that the adjusted limit value is not exceeded;
wherein the operation of the turbocharger assembly is controlled according to a minimum of:
a desired value of the control parameter; and
the adjusted desirable limit value of the control parameter.

16. The method of claim 15, further comprising detecting a request for an increased amount of torque to be supplied by the engine assembly;
wherein the method is performed for a predetermined period of time following the request for an increased amount of torque being detected.

17. The method of claim 15, wherein determining the current value of the control parameter comprises calculating the control parameter based on a predicted current exhaust manifold pressure.

18. The method of claim 15, wherein the method further comprises controlling the operation of the turbocharger assembly using a closed feedback loop if a pressure of the exhaust gases upstream of the turbine exceeds the desirable pressure limit of the exhaust gases upstream of the turbine.

* * * * *